United States Patent
Ebisawa et al.

(10) Patent No.: US 6,895,306 B2
(45) Date of Patent: May 17, 2005

(54) METHOD AND APPARATUS FOR CONTROLLING A TRAY CHANGER INCORPORATED IN A ROBOT CONTROL SYSTEM

(75) Inventors: Kyouichi Ebisawa, Maebashi (JP); Masahiko Hashizume, Takasaki (JP)

(73) Assignees: DENSO Wave Incorporated, Tokyo (JP); Kanto Seiki Co., Ltd., Maebashi (JP)

( * ) Notice: Subject to any disclaimer, the term of this patent is extended or adjusted under 35 U.S.C. 154(b) by 157 days.

(21) Appl. No.: 10/292,190

(22) Filed: Nov. 12, 2002

(65) Prior Publication Data

US 2004/0093120 A1 May 13, 2004

(51) Int. Cl.[7] .............................................. G06F 19/00
(52) U.S. Cl. ..................... 700/245; 700/213; 700/214; 700/215; 700/246; 700/248; 700/249; 700/254; 700/258; 700/260; 318/568.1; 318/568.12; 318/568.13; 318/568.19
(58) Field of Search .............................. 700/245, 213, 700/214, 215, 246, 248, 249, 254, 258, 260; 318/568.1, 568.12, 568.13, 568.19; 901/29, 49, 50, 36, 39, 47; 409/202, 212, 219, 221, 225; 701/14, 23, 30

(56) References Cited

U.S. PATENT DOCUMENTS 5,653,774 A * 8/1997 Bhattacharyya et al. ... 48/198.7
5,683,220 A * 11/1997 Oh et al. ..................... 414/529
6,275,743 B1 * 8/2001 Kondo et al. ............... 700/214
6,658,325 B2 * 12/2003 Zweig ......................... 700/245

FOREIGN PATENT DOCUMENTS

JP 63-57155 3/1988
JP 407241745 A * 9/1995

OTHER PUBLICATIONS

Vischer, Control architecture for a robot with visual and tactile capabilities skilled in sorting dishes, 1992, IEEE, Page(s): 143–146.*

Jagannathan et al., Adaptive network control of a mobile base with an onboard arm for mars greenhouse operation, IEEE, 201, pp. 606–611.*

* cited by examiner

Primary Examiner—Thomas G. Black
Assistant Examiner—McDieunel Marc
(74) Attorney, Agent, or Firm—Harness, Dickey & Pierce, PLC (57) ABSTRACT

A control circuit of a tray changer is interfaced with a control circuit of a robot. A tray changer control program, used for operating the tray changer, is loaded into the robot control system. The robot control system itself, or an operator manipulating an operating terminal of the robot, controls or operates the tray changer according to the tray changer control program loaded in the robot control system.

3 Claims, 8 Drawing Sheets

METHOD AND APPARATUS FOR CONTROLLING A TRAY CHANGER INCORPORATED IN A ROBOT CONTROL SYSTEM

BACKGROUND OF THE INVENTION

The present invention relates to a method and an apparatus for controlling a tray changer incorporated in an NC (i.e., numerically controlled) machine tool or other robot control system. The tray changer of this invention conveys or carries trays each mounting a plurality of workpieces (i.e., materials or components to be machined or processed) thereon one by one into or out of the NC machine tool or the like.

The tray changer is connected or interfaced with an NC machine tool or the like to successively and efficiently supply each tray to the NC machine tool or the like. The tray mounts a plurality of workpieces arrayed thereon. The control of the tray changer is combined with the control of the robot. According to the operation of the tray changer, the workpieces to be machined or processed are carried in or out together with a tray mounting them. A robot, located between the tray and the NC machine tool, receives and delivers each workpiece from the tray to the NC machine tool and also returns a machined or processed workpiece (i.e., product) from the NC machine tool to the same or another tray. The robot, when manufactured, may be associated with a tray changer as an assembled or united facility. In some other cases, the user may join the robot to the tray changer at a later timing for the reasons of the user. The robot successively or selectively receives a workpiece carried on a tray after the tray changer positions a plurality of stacked trays at a predetermined position with respect to the robot. Then, the robot delivers and attaches a selected workpiece to the NC machine tool. Then, the robot detaches a machined or processed workpiece (i.e., product) from the NC machine tool and carries it to a designated tray placed separately from the stacked carry-in trays used for carrying this workpiece in. The delivery of the workpiece between the NC machine tool and the robot is usually direct or may be indirect in some cases.

In general, a plurality of empty trays each having the same size and configuration are stacked adjacently to the robot. When one tray (i.e., uppermost tray) is filled with the machined or processed workpieces (i.e., products), the filled tray is moved out to leave the next empty tray. The tray changer has a fundamental operation suiting for the above-described carrying in-and-out operation. The fundamental operation of the tray changer necessarily varies depending on the type or kind of workpieces to be machined or processed. The program used in controlling the tray changer needs to be modified accordingly.

If the robot is manufactured as a specialized device dedicated to the tray changer, it will be possible and easy to use the common program languages for the control in both of the robot and the tray changer.

On the contrary, when the robot is integrated or combined with the tray changer at a later timing, there is the difficulty in transmitting and receiving data between them due to difference in the program languages or the like. In this case, an adjustment for enabling or smoothing the data transmission required in their operations through their interfaces is definitely necessary.

To this end, in the case that a manufacturer of the tray changer is different from a manufacturer of the robot, a meeting between two manufacturers for such adjustment is required.

Even if the manufacturers have matched the tray changer with the robot in their specifications beforehand prior to the delivery of the system to a user, a similar meeting between them will be necessary again at a later timing if the specifications are changed due to addition or modification. This kind of inconvenience worsens the work efficiency. The necessary work will be doubled.

SUMMARY OF THE INVENTION

In view of the above-described problems of the prior art, the present invention has an object to provide a method and an apparatus for controlling a tray changer incorporated in a robot control system, which is capable of simplifying the control system of the integrated system regardless of the type of an opponent robot with which the tray changer is combined.

To accomplish the above-described and other related objects, the present invention provides a method for controlling a tray changer incorporated in a robot control system, comprising a step of interfacing a control circuit of the tray changer with a control circuit of a robot, a step of loading a tray changer control program (i.e., library) used for operating the tray changer into the robot control system, and a step of causing the robot control system or an operating terminal of the robot to control or operate the tray changer according to the tray changer control program (library). According to the present invention, when the tray changer is delivered from a manufacturer to a user, the control program of the tray changer is separately loaded into the robot control system of the user. The tray changer manufacturer can deliver the tray changer to the user separately from the control software. Installation of the delivered tray changer in the user's facility can be accomplished within a short time. The control software is later transmitted from the tray changer manufacturer to the user via an internet or an other communication media.

It is preferably that the tray changer control program (library) includes an implementation of automatic carry in-and-out processing performed by the tray changer under the control of a central control unit (e.g., CPU) as well as an implementation of manual carry in-and-out operation processing performed by the tray changer through an operating terminal manipulated by an operator. The control method further comprises a step of inhibiting the automatic carry in-and-out processing performed by the tray changer when a manual operation mode of the tray changer is selected, and a step of inhibiting the manual carry in-and-out processing performed by the tray changer when an automatic operation mode of the tray changer is selected. This ensures the safety during the operation of the tray changer.

It is preferably that the control method further comprises a step of allowing an operator of the tray changer to select the manual operation mode or the automatic operation mode of the tray changer through an operating terminal of the robot or through an external operation device, thereby allowing the tray changer to perform the manual carry in-and-out processing when the manual operation mode is selected and perform the automatic carry in-and-out processing when the automatic operation mode is selected. This realizes a unified operation for the robot control system.

It is preferably that the step of causing the robot control system or the operating terminal of the robot to control or operate the tray changer according to the tray changer control program is feasible for simultaneously controlling or operating a plurality of tray changers.

Furthermore, the present invention provides an apparatus for controlling a tray changer incorporated in a robot control system, comprising a robot actuator for driving a robot, a robot control program memory for storing a robot control program (library) to be loaded into the robot control system, an operating terminal for allowing an operator to operate the robot control system, a central control unit for performing an overall control of the robot control system, a tray changer actuator incorporated into the robot control system for driving the tray changer, and a tray changer control program memory incorporated into the robot control system for storing a tray changer control program (library) of the tray changer actuator, wherein the tray changer actuator is controllable through the operating terminal or through an external operating terminal via the central control unit.

It is preferably that the tray changer control program memory stores a program (library) of automatic carry in-and-out processing performed by the tray changer as well as a program (library) of manual carry in-and-out processing performed by the tray changer. The central control unit inhibits the automatic carry in-and-out processing performed by the tray changer when a manual operation mode of the tray changer is selected. And, the central control unit inhibits the manual carry in-and-out processing performed by the tray changer when an automatic operation mode of the tray changer is selected. This ensures the safety during the operation of the tray changer.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENT

A preferred embodiment of the present invention will be explained hereinafter with reference to attached drawings. Identical parts are denoted by the same reference numerals throughout the drawings.

Hereinafter, a preferred embodiment of the present invention will be explained with reference to the attached drawings.

Figure 1:
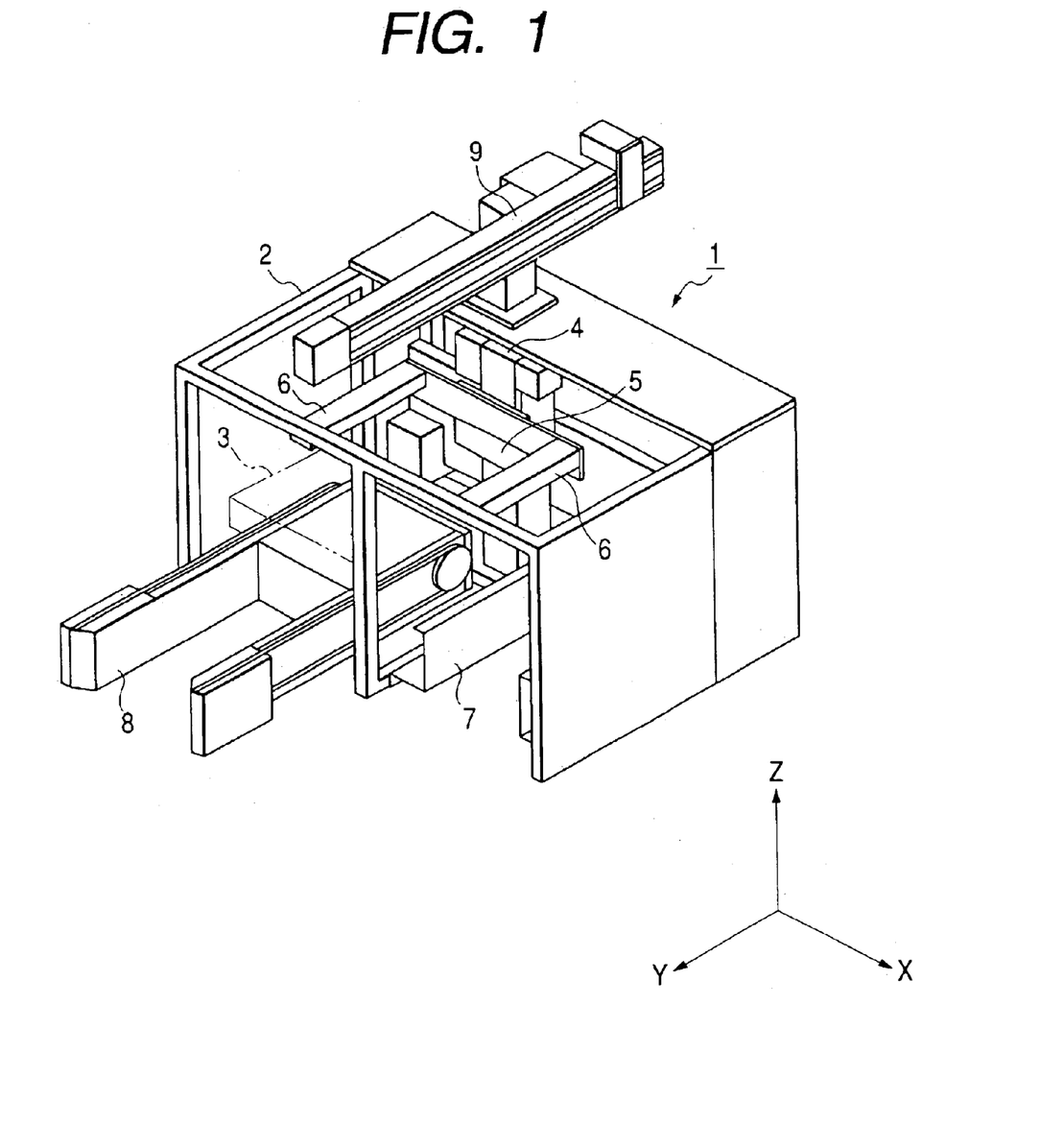
FIG. 1 is a perspective view showing an overall arrangement of a tray changer in accordance with a preferred embodiment of the present invention.

FIG. 1 shows an appearance of a tray changer 1 in accordance with a preferred embodiment of the present invention. The tray changer 1 is attachable to or detachable from an NC (numerically controlled) machine tool or the like to perform an automatic workpiece exchange operation. The purpose of using the tray changer is to improve the work efficiency of the NC machine tool. Many of recent tray changers are associated with robots.

The tray changer 1 has a main body 2 configured into a boxlike frame. The boxlike frame is, for example, constituted by angles and sheet metals. An arm elevating machine 4, provided in the main body 2, raises or lowers a tray 3 in the vertical direction (i.e., in the Z-axis direction). An arm shifting device 5, attached to the arm elevating machine 4, shifts the tray 3 in the horizontal direction (i.e., in the X-axis or Y-axis direction). A pair of parallel arms 6 carry and deliver the tray 3. The arm elevating machine 4 and the arm shifting device 5, each being equipped with a motor or a cylinder (not shown), cooperatively serve as an actuator for moving the tray changer 1.

Two kinds of tray ports 7, provided at the lower part of the main body 2 of the tray changer 1, respectively constitute a base for receiving or mounting a plurality of stacked trays 3. Each tray port 7, serving as a basic unit for conveying the tray 3, allows a tray carrier (not shown) equipped with a hydraulically elevatable table to approach and enter. A carry-in tray port 7, positioned at the left side of the main body 2 in FIG. 1, receives or mounts a plurality of stacked trays 3 each accommodating workpieces to be machined or processed. A carry-out tray port 7, positioned at the right side of the main body 2 in FIG. 1, receives or mounts a plurality of trays 3 each accommodating machined or processed workpieces (i.e., products).

When a plurality of trays 3 are conveyed into the carry-in tray port 7, it is preferable to provide a chain type or roller type tray buffer in the tray port 7. FIG. 1 shows a chain type tray buffer 8. A single-axis loader 9, i.e., a robot, is located on the main body 2 of the tray changer 1. The loader 9 picks a workpiece up from the tray 3 held at a higher position and shifts the workpiece in the back-and-forth direction (i.e., in the Y-axis direction) toward the NC machine tool.

The above-described fundamental arrangement of the tray changer 1 is generally modified according to the type or the specification of the opponent machine tool with which the tray changer 1 is associated. In this respect, some of the already existing functions of the tray changer 1 may be omitted partly or a new function may be added.

Figure 2:
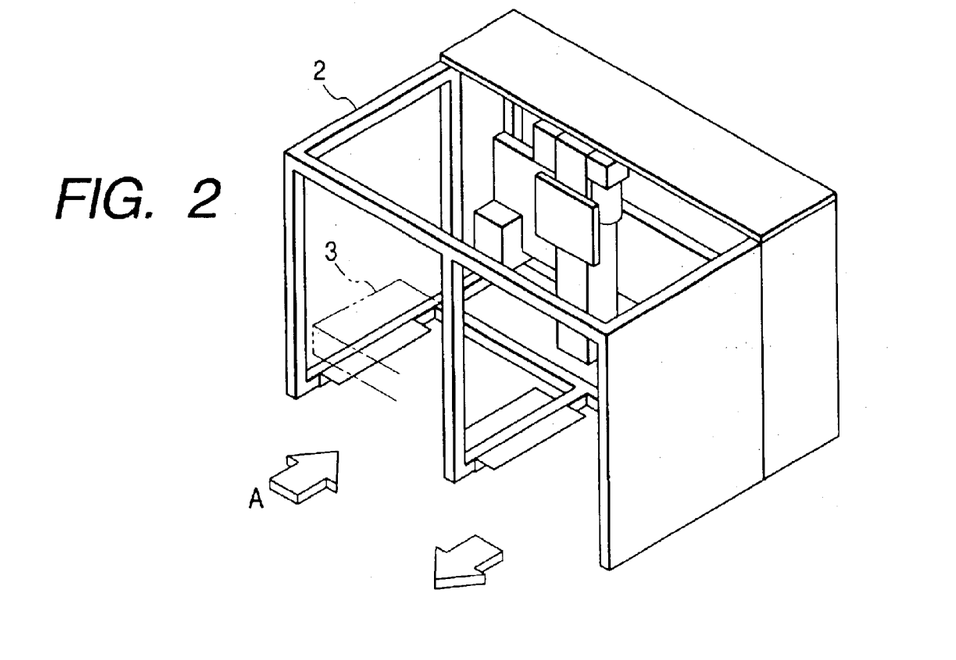
FIG. 2 is a perspective view showing an appearance of another tray changer in accordance with a preferred embodiment of the present invention, characterized by a to-and-fro tray conveying path with a pair of a tray inlet and a tray outlet both provided at the front side of a boxlike frame body of the tray changer.

The shape or configuration of the main body 2 is dependent on the carry-in-and-out direction of the trays 3 with respect to the main body 2. FIG. 2 shows an example of the main body 2 according to which a tray conveying path A is provided in the back-and-forth direction (i.e., in the Y-axis direction) with respect to the main body 2. The tray conveying path A consists of an approaching path extending toward the front side of the main body 2 in the back-and-forth direction and a departing path extending away from the front side of the main body 2 in the back-and-forth direction. According to the tray conveying path A shown in FIG. 2, each tray 3 is conveyed in the backward direction and carried into the left (i.e., carry-in) tray port 7, then shifted from the left (i.e., carry-in) tray port 7 to the right (i.e., carry-out) tray port 7 in the right-and-left direction. Then, the tray 3 is moved away from the right (i.e., carry-out) tray port 7 in the back-and-forth direction.

Figure 3:
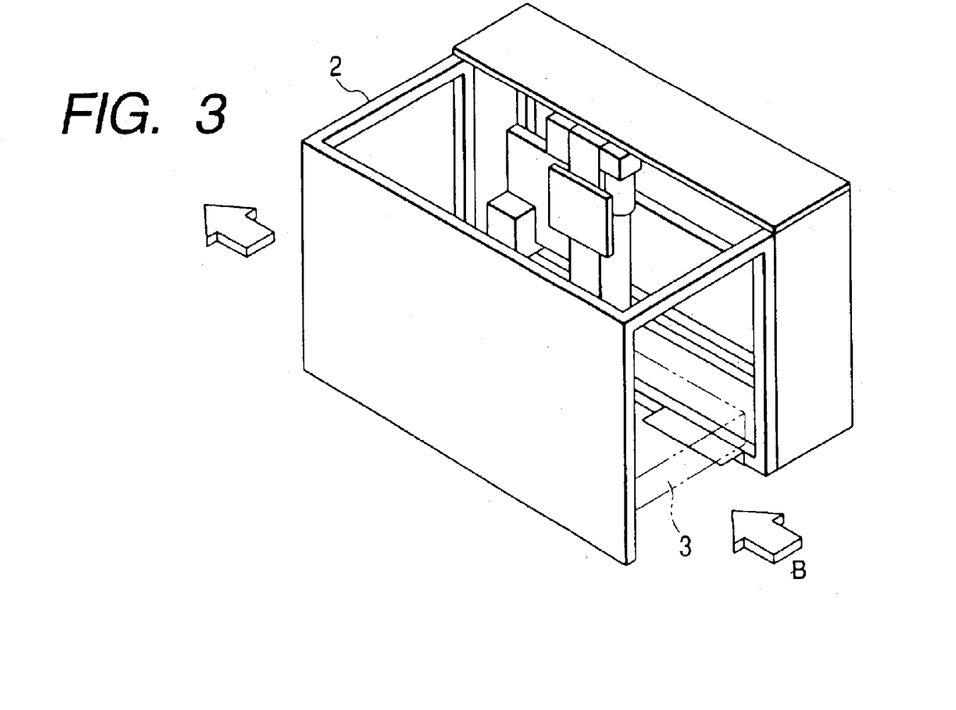
FIG. 3 is a perspective view showing an appearance of another tray changer in accordance with a preferred embodiment of the present invention, characterized by a one-way straight tray conveying path with a pair of a tray inlet and a tray outlet respectively provided at opposed sides of a boxlike frame body of the tray changer.

FIG. 3 shows another example of the main body 2 according to which a tray conveying path B is provided in the right-and-left direction (i.e., in the X-axis direction) with respect to the main body 2. The tray conveying path B consists of an approaching path extending toward the right side of the main body 2 in the right-and-left direction and a departing path extending away from the left side of the main body 2 in the right-and-left direction. According to the tray conveying path B shown in FIG. 3, each tray 3 is conveyed from the right side with respect to the main body 2 and is carried into the right (i.e., carry-in) tray port 7, then shifted in the same direction from the right (i.e., carry-in) tray port 7 to the left (i.e., carry-out) tray port 7. Then, the tray 3 is moved away from the left (i.e., carry-out) tray port 7 to the left direction with respect to the main body 2.

Figure 4:
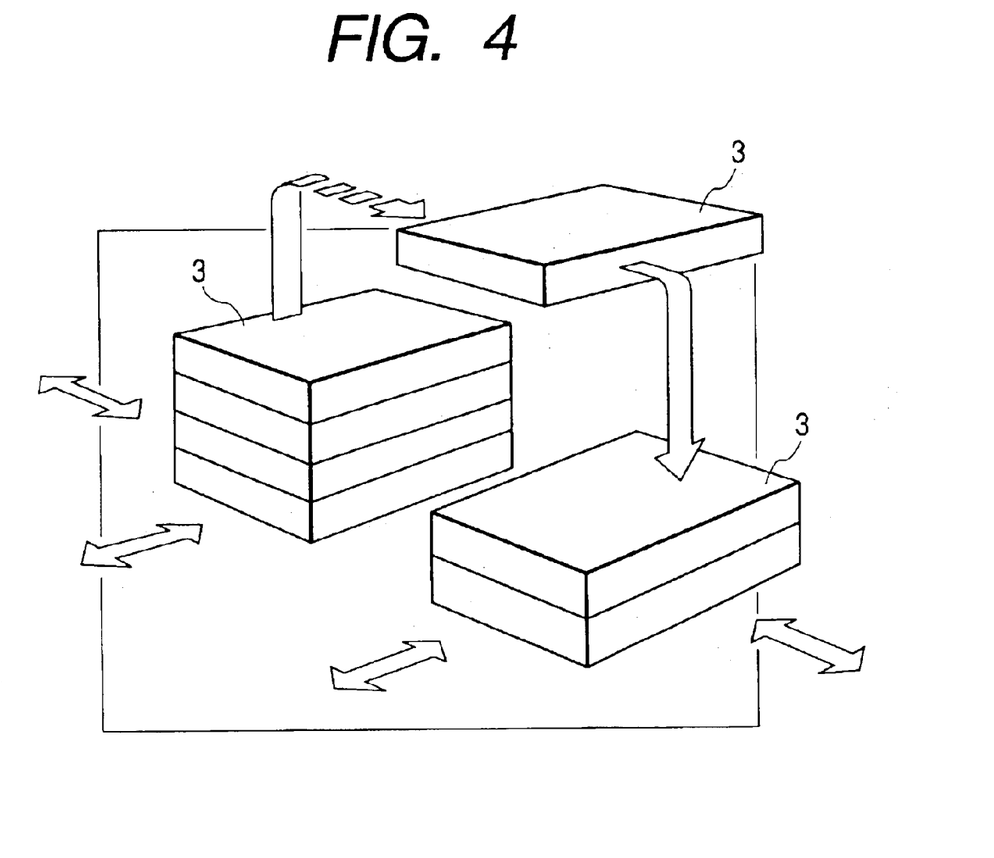
FIG. 4 is a view explaining the tray carrying in-and-out operation performed by the tray changer in accordance with a preferred embodiment of the present invention.

FIG. 4 explains the tray carrying in-and-out operation performed by the tray changer 1. The robot successively supplies the workpieces from the uppermost tray 3 positioned on the carry-in tray port 7 to a machine tool (e.g., NC machine tool 200 shown in FIG. 6). When the uppermost tray 3 becomes empty, the tray changer 1 moves this tray 3 to the right side and places it on the empty trays 3 having been already stacked on the carry-out tray port 7. These empty trays 3 are used for receiving the machined or processed workpieces (i.e., products) supplied from the machine tool 200. Alternatively, it is possible to prepare special trays dedicated for receiving the machined or processed workpieces (i.e., products). In this case, the empty trays 3 are replaced with such special trays.

More specifically, the tray arms 6 are shifted to the left side (i.e., carry-in side) of the main box 2 and poses at a predetermined upper position. Then, the tray arms 6 are lowered until they reach or land on the uppermost tray 3. Then, the tray arms 6 securely hold the uppermost tray 3. The arm elevating machine 4 raises the tray arms 6 holding the uppermost tray 3. Then, after finishing the elevating operation, the arm shifting device 5 causes a rightward pitch motion of the tray arms 6 to form a flat surface together with the perpendicularly extending loader 9.

A robot hand of the loader 9 performs the workpiece loading operation, while the arm shifting device 5 shifts the tray arms 6 carrying the tray 3 horizontally toward the right side (i.e., carry-out side) of the main body 2. When the tray 3 becomes empty, the arm elevating machine 4 lowers the tray arms 6 holding the empty tray 3 to place this tray 3 on other empty trays 3 being stacked at the right side (i.e., carry-out side) of the main body 2. In this case, when the landing of the tray 3 is detected, the tray arms 6 release the tray 3. The arm shifting device 5 returns the tray arms 6 to the left side (i.e., carry-in side) of the main body 2. Then, the tray arms 6 hold the next tray 3 and repeat the same operation.

According to this embodiment, the tray changer 1 is equipped with the loader 9 serving as a robot. The tray changer 1 is generally required to perform complicated carry in-and-out operation according to the opponent machine tool 200. Thus, the tray changer 1 is generally equipped with a general-purpose robot. Accordingly, it is necessary to link the mutually different controls between the tray changer 1 and a robot control system 100 and adjust program languages to unify the overall control of the associated or integrated system.

The robot (i.e., loader 9) of the above-described embodiment is a handling robot which is positioned adjacent to the machine tool 200 to supply a workpiece to the machine tool 200 and to receive the machined or processed workpiece (i.e., product) from the machine tool 200. The practical functions of the robot can be variously changed, although the fundamental arrangement of the robot is already known. When it is necessary to carry in and out numerous workpieces, a tray changer equipped with the robot is associated with the machine tool 200.

The present invention relates to the linking or connection required in incorporating the tray changer 1 into the control system of the robot (i.e., loader 9), and eliminates troublesome procedures or adjustments by entirely matching the control of the tray changer 1 with the control of the opponent robot. In general, the control of the tray changer 1 is stationary or constant, while the control of the robot is variously or frequently changed. Accordingly, adjusting the control of the tray changer to fit the control of the robot is efficient when they are attached to the machine tool 200.

Figure 5:
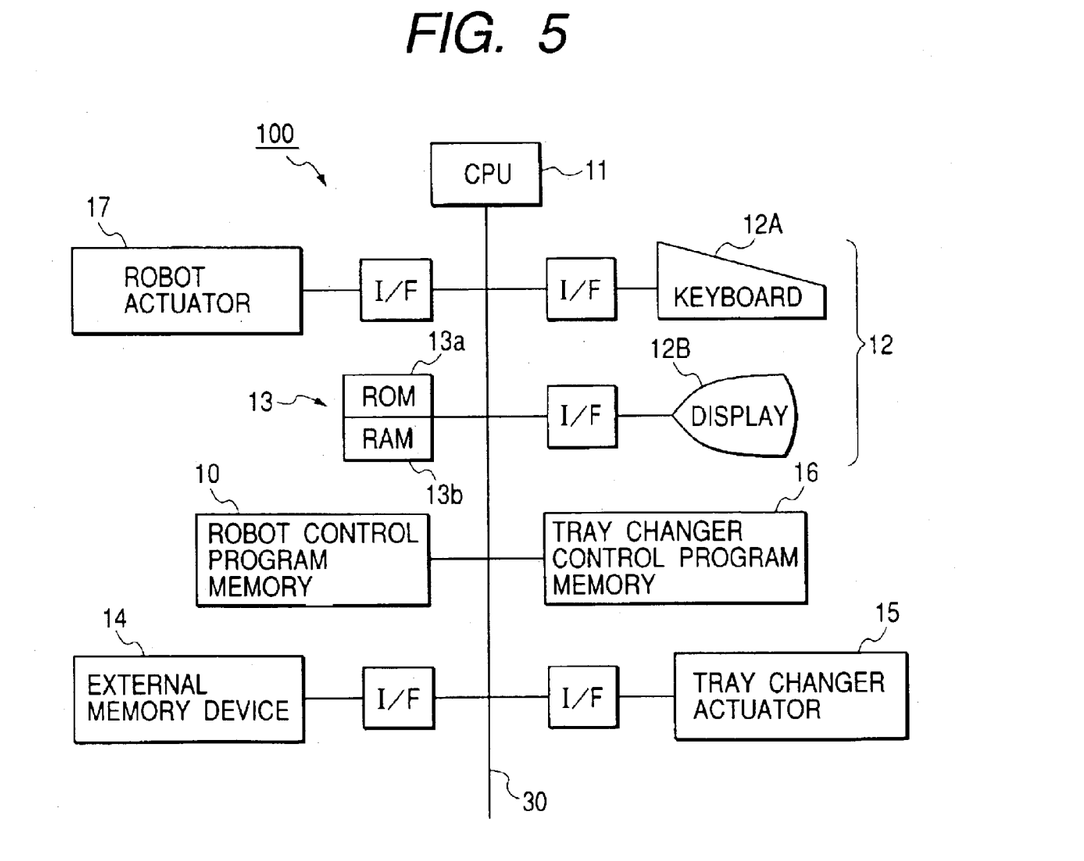
FIG. 5 is a block diagram showing a robot control system incorporating the tray changer in accordance with the preferred embodiment of the present invention.

Accordingly, the overall control of the combined system can be simplified by eliminating the unnecessary overlap of respective controls of the robot and the tray changer. A control circuit of the tray changer 1, including a tray changer actuator 15, is connected to a control circuit of the robot 9. A control program of the tray changer 1 (hereinafter referred to as tray changer control program 16A), stored in a tray changer control program memory 16, is installed into the robot control system 100. The tray changer control program 16A is a software which is referred to as a library. This library is also applicable to an automatic mode, a manual mode, and a semiautomatic or other mode. The tray changer 1 is generally associated with a manipulation board allowing an operator to manually control the tray changer 1.

A robot operating terminal 12, including a keyboard 12A and a display 12B, allows an operator to install (load) or uninstall (unload) the tray changer control program 16A into the robot control system 100. An adjustment is performed to match the program language of the tray changer control program 16A with that of the robot. As a result, the tray changer control program 16A has the same program language as that of the program stored in a robot control program memory 10. Thus, the tray changer control program 16A runs under the control configuration of a central control unit 11 of the robot, constituted by a CPU, to control the operation of the tray changer 1. FIG. 5 shows a control configuration of the robot control system 100 in accordance with the preferred embodiment of the present invention.

A robot actuator 17 controls the operation of the robot, i.e., drives the robot 9 according to instructions or commands supplied from the CPU 11. More specifically, the robot actuator 17 controls all of three drive motors (not shown) provided for shifting or moving the robot arm in three-dimensional directions (i.e., X-axis, Y-axis and Z-axis directions). The position control of the robot arm, i.e., actuation of the robot actuator 17, is performed according to instructions or commands given from the central control unit 11 with reference to the program in the robot control program memory 10.

An operator inputs the data or information relating to the control of the robot 9 through the robot operating terminal 12 including the keyboard 12A and the display 12B. The memories 13, consisting of ROM 13*a* storing system programs and RAM 13*b* storing temporary data such as position data, are associated with CPU 11. The control instructions or commands of CPU 11 are transmitted via a bus 30 and interfaces (I/F) to the robot actuator 17 or the tray changer actuator 15. Some of the data stored in the memories 13 can be transferred via an interface (I/F) to an external memory device 14.

Furthermore, using a RS232C interface or a comparable interface makes it possible to transmit the data of the memories 13 to a personal computer via an available communication media. FIG. 5 shows the control configuration of the robot control system 100 as an integrated system including the tray changer 1 combined with the robot 9. The operation of the tray changer 1 is thus controlled by the robot control system 100.

Incorporation of the tray changer 1 into the robot control system 100 is realized by performing a task of the robot control. In the robot control system 100, data or signals flow from one to another via the bus 30 in a bidirectional fashion. The robot operating terminal 12 allows the operator to input or output the data relating to the tray changer 1. Thus, the operator can manipulate the tray changer 1 through the robot operating terminal 12. It is also possible for the operator to transfer or send the data relating to the tray changer 1 to an external memory device through the robot operating terminal 12. In this respect, an operating terminal dedicated to the tray changer 1 can be omitted before the tray changer 1 is incorporated or combined with the robot control system 100.

Figure 6:
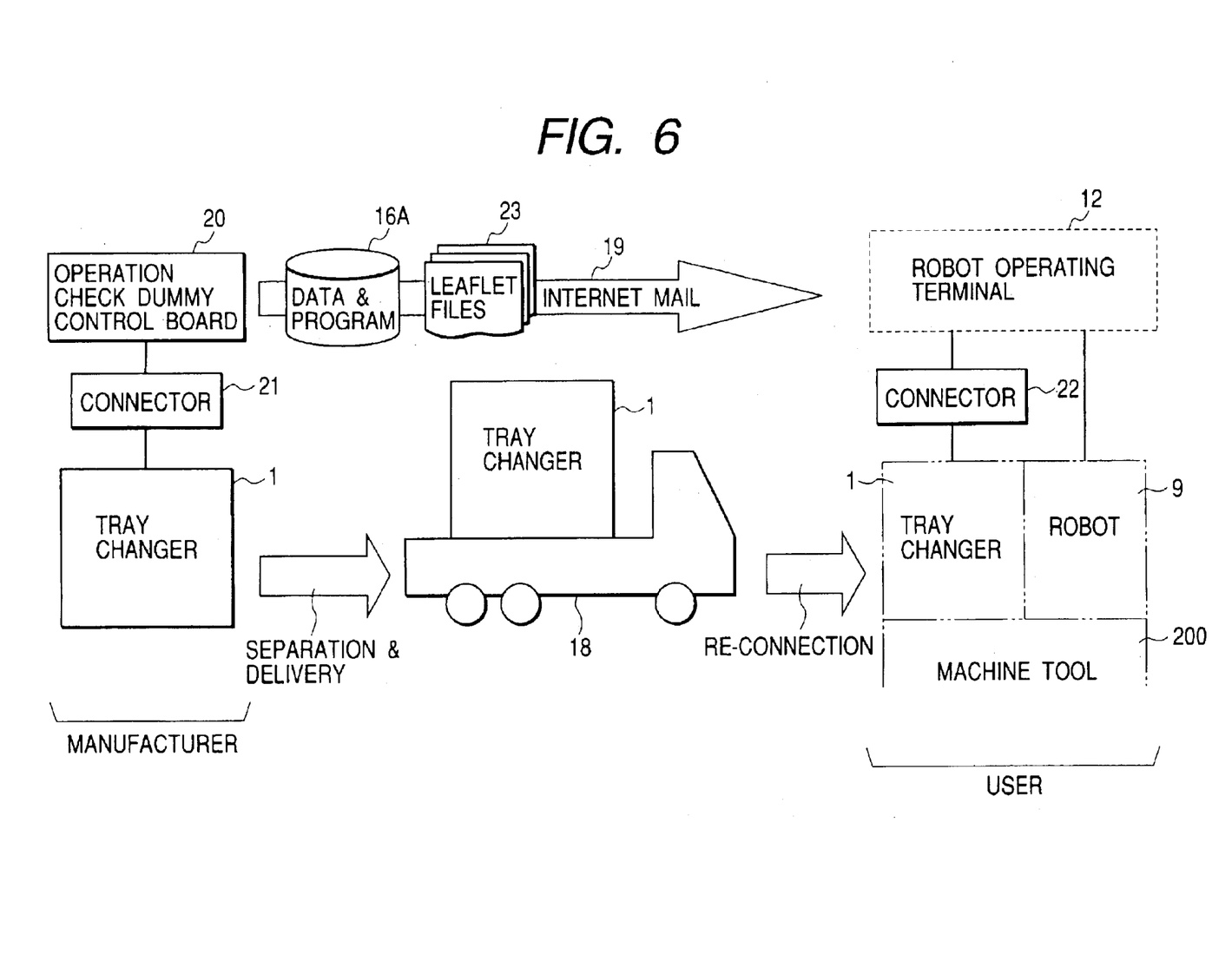
FIG. 6 is a schematic model explaining the incorporation of the tray changer into the robot control system performed between a manufacturer and a user in accordance with the preferred embodiment of the present invention.

FIG. 6 is a schematic model explaining the incorporation of the tray changer 1 into the robot control system 100 performed between a manufacturer of the tray changer 1 and a user of this tray changer.

The hardware of the tray changer 1, i.e., the main body 2 and other structural components, is delivered beforehand to the user by a truck 18 or the like. The hardware of the tray changer 1 is directly connected to or combined with the robot control system 100. The necessary wiring connection for the control system is also finished at this stage. For example, a conventionally known wring-saving system will be available to accomplish the wiring connection within a short time.

This wiring-saving system requires no additional wiring work for the operating board even if an input/output device is newly added because the signal transmission in this system is performed by converting the signals into serial communication data. Thus, the wiring arrangement is simple. As a result, the control system starts its operation upon accomplishing the necessary connection of the communication and power source lines between the tray changer 1 and the robot control system 100.

The characteristic features of the present invention reside in that the control software of the tray changer 1 is once separated from the hardware of the tray changer 1 when the tray changer 1 is delivered to the user. The separated software for the control of the tray changer 1, i.e., tray changer control program (library) 16A, is later transmitted from the manufacturer to the user, for example, via an internet 19 or via any other currently available communication media. The tray changer control program (library) 16A is directly incorporated into the software of the robot control system 100. The explanatory leaflet files 23 for the tray changer 1 can be also transmitted to the user via the internet 19.

Thus, even if located at a remote place, the user can immediately receive the information of the tray changer 1 and can load or install the software and information of the tray changer 1 into the robot control system 100 without requiring any specialistic or personal assistance by the tray changer manufacturer. Thus, the facility or machines of the user can restart its operation promptly and smoothly.

Prior to the delivery of the tray changer 1, the tray changer manufacturer connects a dummy operating board 20 to the tray changer 1 to check whether or not the tray changer 1 operates normally without causing errors when the tray changer 1 is connected to or combined with the opponent robot control system 100. A connector 21 of the dummy operating board 20 is disconnected from the tray changer 1 when the examination or inspection through the dummy operating board 20 is successful. Then, the manufacturer delivers the tray changer 1 to the user. In other words, prior to the delivery of the tray changer 1 to the user, the examination or inspection performed through the dummy operating board 20 realizes a virtual circumstance imparted on the tray changer 1 to be delivered to the user when incorporated into the opponent robot system. Thus, once the tray changer 1 passes the examination or inspection, the installation of the tray changer 1 into the robot control system 100 in the user's facility is simply accomplished by connecting the tray changer 1 via a connector 22 to the operating terminal 12 of the opponent robot control system 100.

If the necessity of adding functions to the tray changer 1 arises after finishing the installation of the tray changer 1 in the user's facility, the loading or installation of the necessary software can be done easily by requiring the tray changer manufacturer to provide additional or revised control program (library) to the user. The user reloads or reinstalls the necessary software into the robot control system 100. After finishing the reloading or reinstallation of the software, the robot control system 100 resumes its operation under the renewed software. Alternatively, the user can modify the control contents of the robot control system 100 by revising its own program without requiring the program supplied from the tray changer manufacturer.

Figure 7:
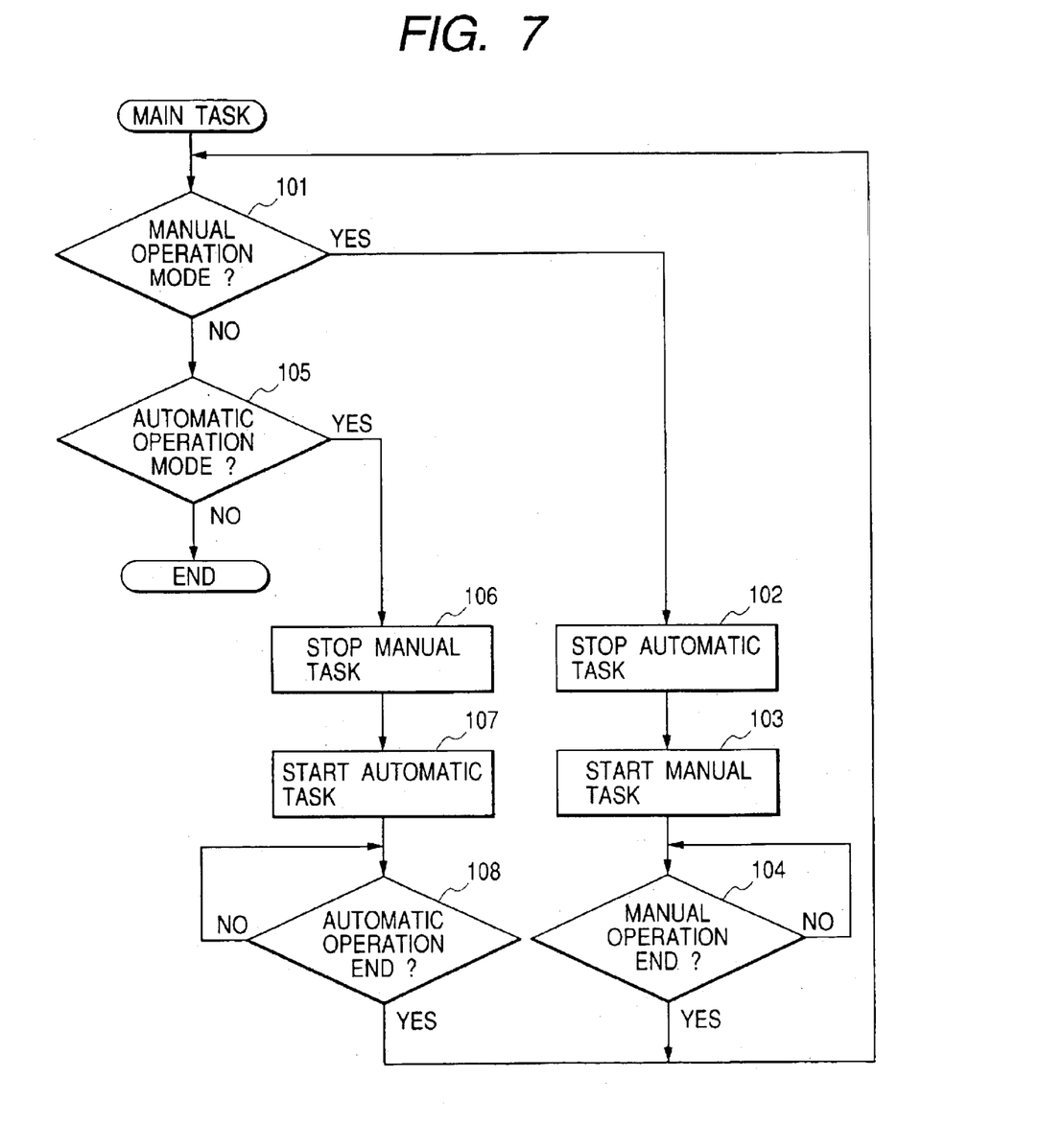
FIG. 7 is a flowchart showing the switching of a manual operation mode and an automatic operation mode for the tray changer performed in the robot control system in accordance with the present invention.
Figure 8:
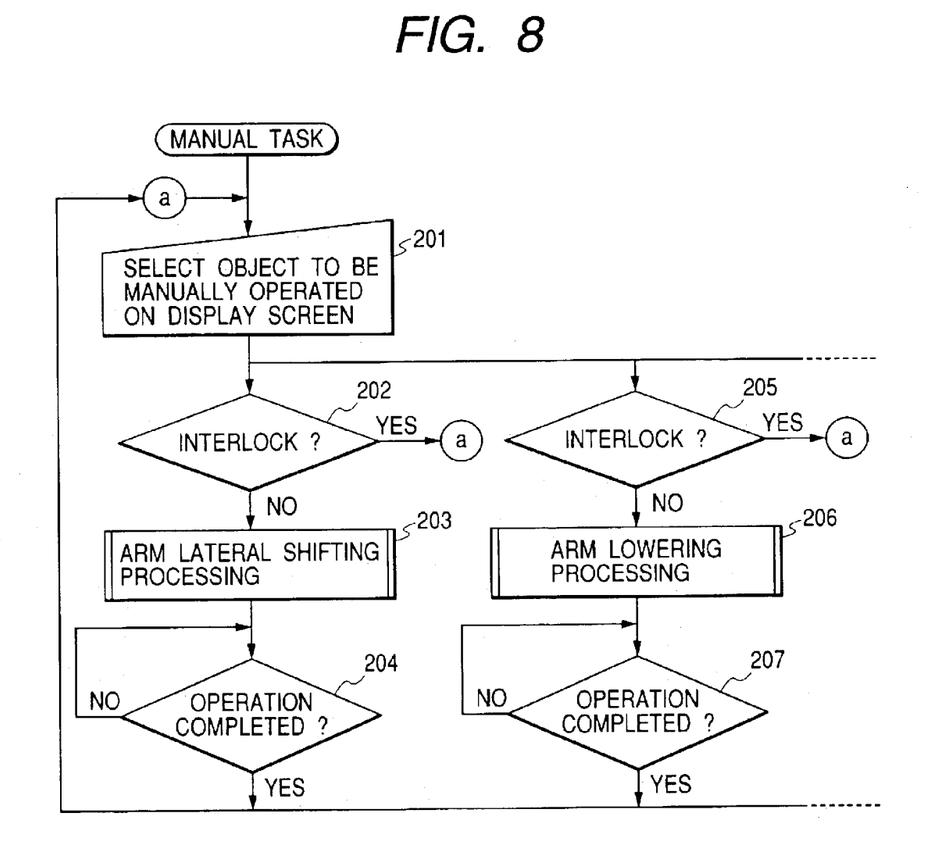
FIG. 8 is a flowchart showing the details of a manual task for manipulating the tray changer performed in response to selection of the manual operation mode in accordance with the preferred embodiment of the present invention.
Figure 9:
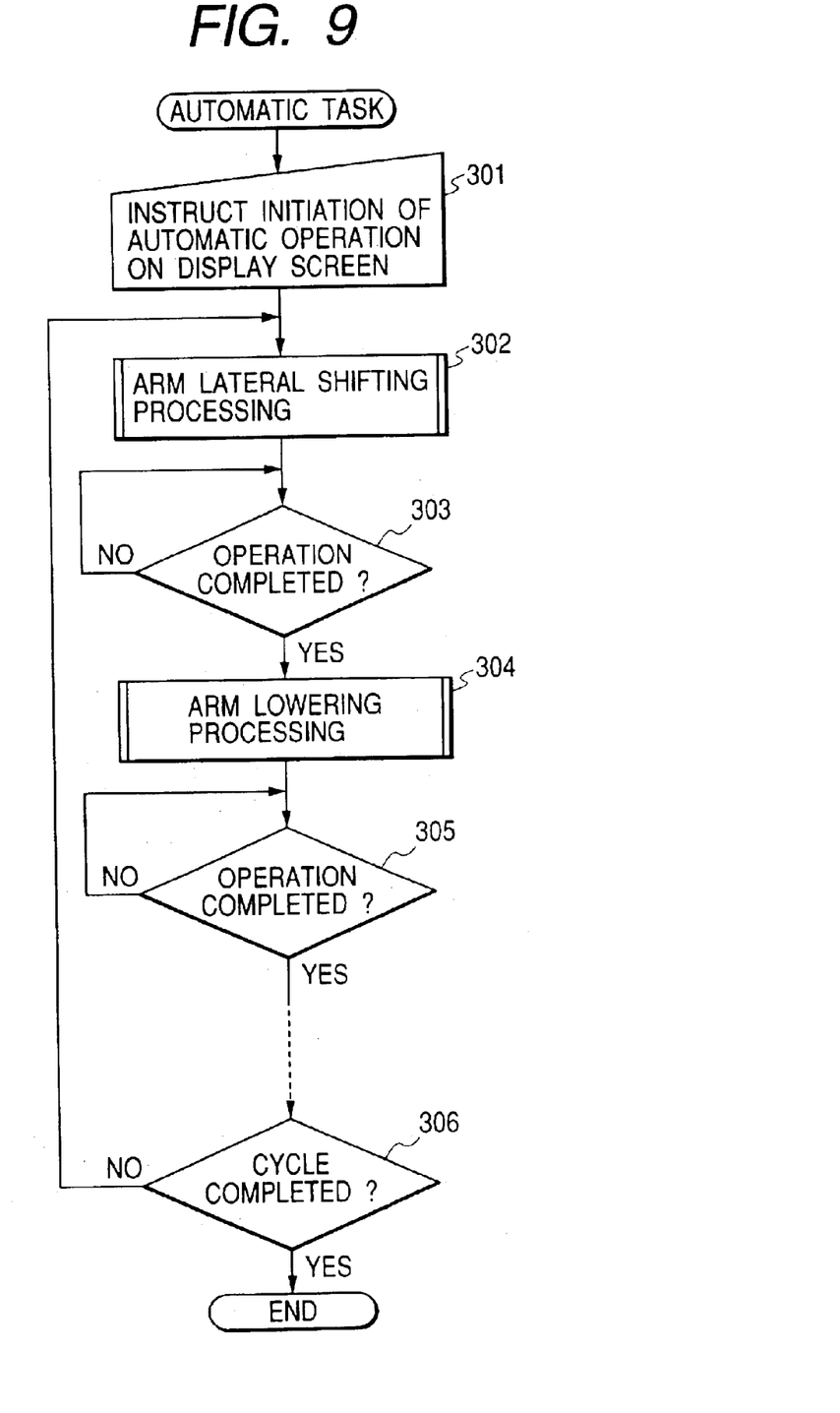
FIG. 9 is a flowchart showing the details of an automatic task for manipulating the tray changer performed in response to selection of the automatic operation mode in accordance with the preferred embodiment of the present invention.

FIGS. 7 through 9 are flowcharts showing the contents of a programmable controller (PLC) relating to the operation of the tray changer. The important thing to be given primary priority is the safety in operating the tray changer in the robot control system 100.

To this end, as shown in FIG. 7, the switching of a manual operation mode and an automatic operation mode for the tray changer is surely performed in the robot control system 100.

After the main task starts, in step 101, a judgement is made to check as to whether or not the manual operation mode is selected. When the manual operation mode is selected (i.e., YES in step 101), the control flow proceeds to step 102 to stop the automatic task so as to inhibit the automatic carry in-and-out operation of the tray changer 1. Then, in step 103, the manual task starts to allow an operator to manipulate the tray changer 1. The operator manipulates the manipulation board associated with the tray changer 1 to manually control the tray changer 1. Subsequently, in step 104, it is checked whether or not the manual operation is completed. When the manual operation is not finished yet (i.e., NO in step 104), the judgement of step 104 is repeated until the judgement result turns into YES. When the manual operation is finished (i.e., YES in step 104), the control flow returns to step 101 to repeat the judgement in step 101.

When the manual operation mode is not selected (i.e., NO in step 101), the control flow proceeds to step 105 to further make a judgement as to whether or not the automatic operation mode is selected. When the automatic operation mode is selected (i.e., YES in step 105), the control flow proceeds to step 106 to stop the manual task so as to inhibit the manual carry in-and-out operation of the tray changer 1. Then, in step 107, the automatic task starts to allow the CPU 11 perform the automatic carry in-and-out operation of the tray changer 1. Subsequently, in step 108, it is checked whether or not the automatic operation is completed. When the automatic operation is not finished yet (i.e., NO in step 108), the judgement of step 108 is repeated until the judgement result turns into YES. When the automatic operation is finished (i.e., YES in step 108), the control flow returns to step 101 to repeat the judgement in step 101. When the judgement result in step 105 is NO, this routine ends.

FIG. 8 is a flowchart showing the details of the manual task (triggered in the step 103) performed when the manual operation mode is selected.

After the manual task starts, the operator selects an object to be manually operated on a display screen (step 201). For example, the operator may intend to manually shift the arms 6 in the lateral direction (i.e., in the X-axis or Y-axis direction). In this case, the operator checks the presence of interlock (step 202). When the interlock is present (YES in step 202), the operator gives up the manual operation. On the other hand, when the interlock is released (i.e., NO in step 202), the operator performs the arm lateral shifting processing (step 203). By performing the arm lateral shifting processing, the operator can manually shift the arms 6 in the lateral direction so as to correct or optimize the position of a tray 3 being currently in trouble. Subsequently, it is checked as to whether or not the arm lateral shifting processing is completed (step 204). When the arm lateral shifting processing is not finished yet (i.e., NO in step 204), the judgement of step 204 is repeated until the judgement result turns into YES. When the arm lateral shifting processing is finished (i.e., YES in step 204), the operator stops the manual operation.

Similarly, the operator may intend to manually lower the arms 6 in the vertical direction (i.e., in the Z-axis direction). In this case, the operator checks the presence of interlock (step 205). When the interlock is present (YES in step 205), the operator gives up the manual operation. On the other hand, when the interlock is released (i.e., NO in step 205), the operator performs the arm lowering processing (step 206). By performing the arm lowering processing, the operator can manually lower the arms 6 in the vertical direction so as to correct or optimize the position of a tray 3 being currently in trouble. Subsequently, it is checked as to whether or not the arm lowering processing is completed (step 207). When the arm lowering processing is not finished yet (i.e., NO in step 207), the judgement of step 207 is repeated until the judgement result turns into YES. When the arm lowering processing is finished (i.e., YES in step 207), the operator stops the manual operation.

In performing the manual operation of the tray changer 1, the operator manipulates the manipulation board associated with the tray changer 1 while the operator confirms the actual position of the tray 3 by seeing it with the naked eye. For the safety of the manual operation, the presence of interlock is checked every time the operator starts each manual operation.

A conventionally known teaching pendant can be also used to manipulate the tray changer 1. According to this embodiment, the operator can perform the manual operation of the tray changer 1 through an external operating terminal available through input/output and communication functions of the robot control system 100.

FIG. 9 is a flowchart showing the details of the automatic task (triggered in the step 107) performed when the automatic operation mode is selected.

After the automatic task starts, the operator instructs initiation of the automatic operation on the display screen (step 301). Next, in step 302, the CPU 11 performs the arm lateral shifting processing. Subsequently, in step 303, it is checked as to whether or not the arm lateral shifting processing is completed. When the arm lateral shifting processing is not finished yet (i.e., NO in step 303), the judgement of step 303 is repeated until the judgement result turns into YES. When the arm lateral shifting processing is finished (i.e., YES in step 303), the control flow proceeds to step 304. In step 304, the CPU 11 performs the arm lowering processing. Subsequently, in step 305, it is checked as to whether or not the arm lowering processing is completed. When the arm lowering processing is not finished yet (i.e., NO in step 305), the judgement of step 305 is repeated until the judgement result turns into YES. In this manner, completion of each automatic processing is checked before starting the next automatic processing. After the required operations have been serially performed in this manner, the control flow proceeds to step 306 to check whether or not the complete cycle of the automatic operation terminates.

As described above, like the case where the tray changer is solely operated, the above-described embodiments secures or assures the safety during the operation of the tray changer 1 even after the tray changer 1 is incorporated into the robot control system 100.

During the manual operation of the tray changer, the operation of the machine tool 200 is restricted to avoid adverse influence to the tray changer 1.

As apparent from the foregoing description, the present invention makes it possible to simplify the installation of the tray changer 1 into the robot control system 100 by efficiently linking the control software of the tray changer 1 with the control software of the robot control system 100. As a result, the date or time of delivery of the tray changer 1 can be shortened. The cost for installing the tray changer 1 can be reduced without sacrificing the safety of the tray changer 1.

As described above, the preferred embodiment of the present invention provides a method for controlling a tray changer (1) incorporated in a robot control system (100). According to this method, a control circuit of the tray changer is interfaced with a control circuit of a robot (9). A tray changer control program (16A), used for operating the tray changer (1), is loaded into the robot control system (100). The robot control system itself, or an operator manipulating an operating terminal (12) of the robot (9), controls or operates the tray changer (1) according to the tray changer control program (library; 16A).

The tray changer control program (16A) includes an implementation of automatic carry in-and-out processing performed by the tray changer (1) under the control of a central control unit (e.g., CPU 11) as well as an implementation of manual carry in-and-out operation processing performed by the tray changer (1) through an operating terminal (12) manipulated by an operator. The automatic carry in-and-out processing performed by the tray changer (1) is inhibited when a manual operation mode of the tray changer (1) is selected. And, the manual carry in-and-out processing performed by the tray changer (1) is inhibited when an automatic operation mode of the tray changer (1) is selected.

The operator of the tray changer (1) is allowed to select the manual operation mode or the automatic operation mode of the tray changer (1) through an operating terminal (12) of the robot (9) or through an external operation device, thereby allowing the tray changer (1) to perform the manual carry in-and-out processing when the manual operation mode is selected and perform the automatic carry in-and-out processing when the automatic operation mode is selected.

The control or operation of the tray changer (1) realized by the robot control system (100) or by the operating terminal (12) of the robot (9) according to the tray changer control program (16A) is not limited to only one tray changer (1) and accordingly feasible for simultaneously controlling or operating a plurality of tray changers (1).

As described above, the preferred embodiment of the present invention provides an apparatus for controlling a tray changer (1) incorporated in a robot control system (100). According to this apparatus, a robot actuator (17) drives a robot (9). A robot control program memory (10) is provided to store a robot control program (library; 16A) to be loaded into the robot control system (100). An operating terminal (12) allows an operator to operate the robot control system (100). A central control unit (11) is provided to perform an overall control of the robot control system (100). A tray changer actuator (15), incorporated into the robot control system (100), drives the tray changer (1). A tray changer control program memory (16), incorporated into the robot control system (100), stores a tray changer control program (library; 16A) of the tray changer actuator (15). The tray changer actuator (15) is controllable through the operating terminal (12) or through an external operating terminal via the central control unit (11).

The tray changer control program memory (16) stores a program of automatic carry in-and-out processing performed by the tray changer (1) as well as a program of manual carry in-and-out processing performed by the tray changer (1). The central control unit (11) inhibits the automatic carry in-and-out processing performed by the tray changer (1) when a manual operation mode of the tray changer (1) is selected. The central control unit (11) inhibits the manual carry in-and-out processing performed by the tray changer (1) when an automatic operation mode of the tray changer (1) is selected.

What is claimed is:

1. A method for controlling a tray changer incorporated in a robot control system, comprising:

a step of interfacing a control circuit of said tray changer with a control circuit of a robot;

a step of loading a tray changer control program into the robot control system, said tray changer control program being used for operating said tray changer; and a step of causing said robot control system or an operating terminal of the robot to control or operate said tray changer according to said tray changer control program; wherein said step of causing said robot control system or the operating terminal of the robot to control or operate said tray changer according to said tray changer control program is feasible for simultaneously controlling or operating a plurality of tray changers.

2. The method for controlling the tray changer incorporated in the robot control system in accordance with claim 1, wherein said tray changer control program includes an implementation of automatic carry in-and-out processing performed by said tray changer as well as an implementation of manual carry in-and-out operation processing performed by said tray changer, and the control method further comprises:

a step of inhibiting said automatic carry in-and-out processing performed by said tray changer when a manual operation mode of said tray changer is selected; and a step of inhibiting said manual carry in-and-out processing performed by said tray changer when an automatic operation mode of said tray changer is selected.

3. The method for controlling the tray changer incorporated in the robot control system in accordance with claim 2, further comprising:

a step of allowing an operator of said tray changer to select said manual operation mode or said automatic operation mode of said tray changer through an operating terminal of said robot or through an external operation device, thereby allowing said tray changer to perform said manual carry in-and-out processing when said manual operation mode is selected and perform said automatic carry in-and-out processing when said automatic operation mode is selected.

* * * * *